No. 708,201. Patented Sept. 2, 1902.
F. B. CASE.
DRIVING, BRAKING, AND COASTING MECHANISM.
(Application filed June 28, 1901.)
(No Model.) 2 Sheets—Sheet 1.
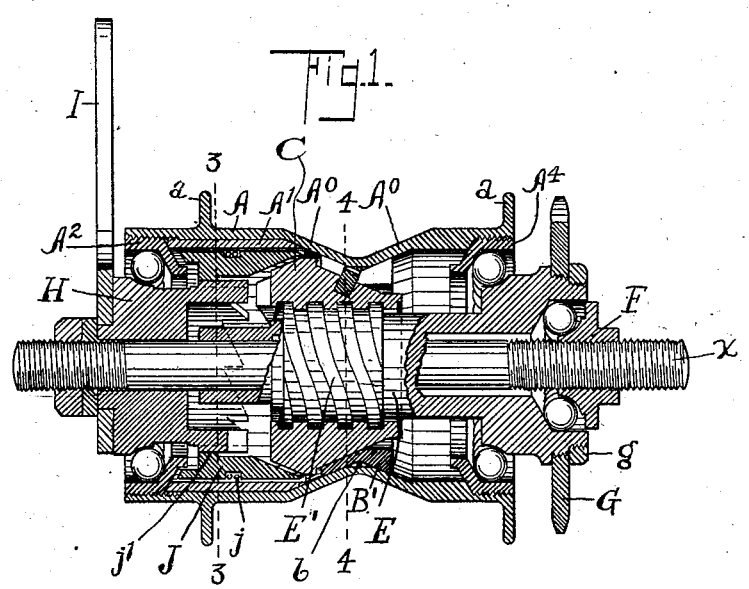
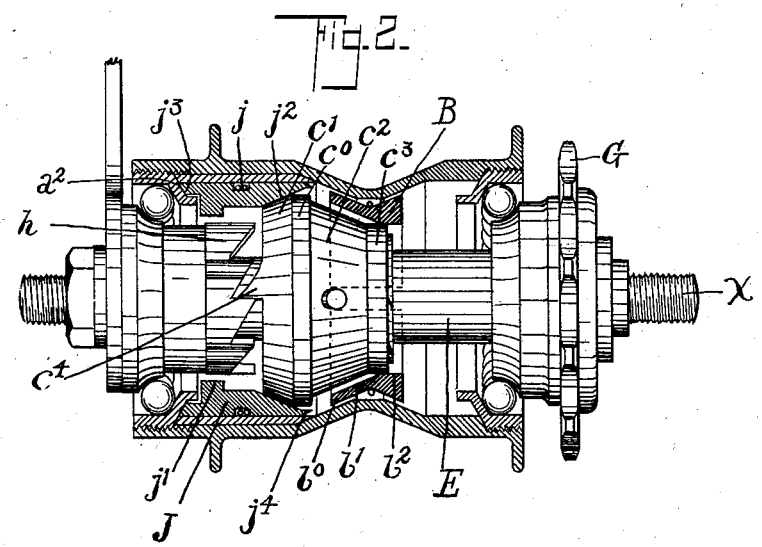
WITNESSES:
C. S. Davis
C. M. Perkins
INVENTOR:
Frank B. Case,
by Osgood & Davis
his attorneys No. 708,201. Patented Sept. 2, 1902.
F. B. CASE.
DRIVING, BRAKING, AND COASTING MECHANISM.
(Application filed June 28, 1901.)
(No Model.) 2 Sheets—Sheet 2.
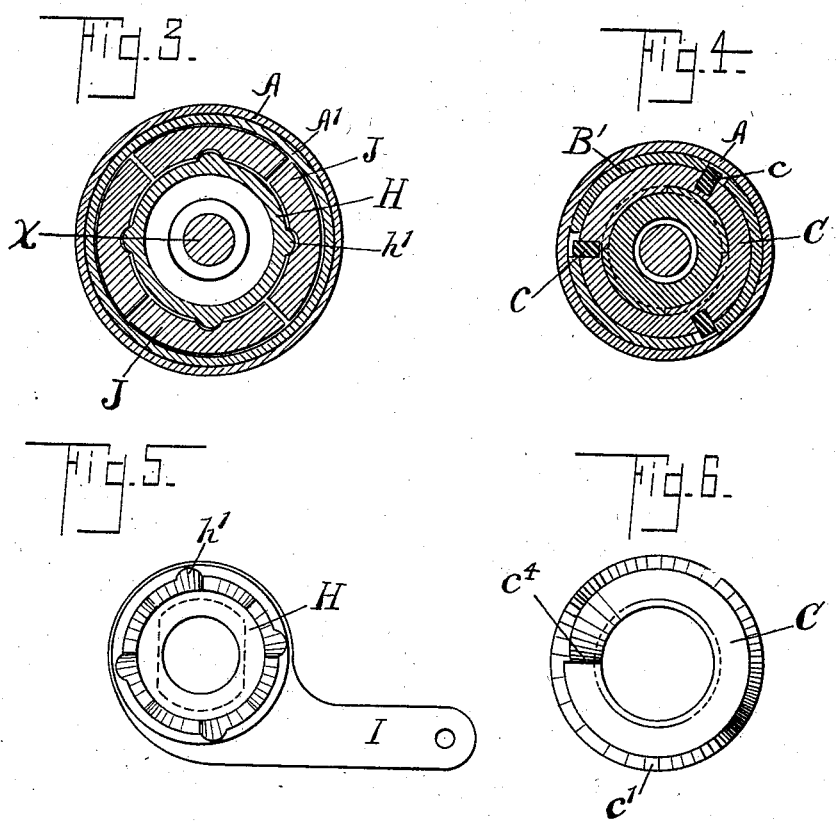

UNITED STATES PATENT OFFICE.

FRANK B. CASE, OF ROCHESTER, NEW YORK, ASSIGNOR TO RIGGS-SPENCER COMPANY, OF ROCHESTER, NEW YORK, A CORPORATION.

DRIVING, BRAKING, AND COASTING MECHANISM.

SPECIFICATION forming part of Letters Patent No. 708,201, dated September 2, 1902.

Application filed June 28, 1901. Serial No. 66,406. (No model.)

*To all whom it may concern:*

Be it known that I, FRANK B. CASE, a citizen of the United States, and a resident of Rochester, in the county of Monroe and State of New York, have invented certain new and useful Improvements in Driving, Braking, and Coasting Mechanism, of which the following is a specification.

The object of this invention is to provide a driving, a braking, and a coasting mechanism for use in connection with vehicles, and particularly bicycles, that is constituted of few parts and can be easily assembled and taken apart and one in which the clutch and braking action is positive and certain. These advantages will be disclosed in the following specification.

The driving and braking mechanisms may be used separately, as will be obvious when they are described.

In the drawings, which are a part of this specification, Figure 1 is a longitudinal section of the rear hub of a bicycle equipped with the improved coaster and brake device, in which said device is shown partly in sectional view and in which the parts are shown in operative position for driving. Fig. 2 is likewise a longitudinal section of the rear hub, in which certain of the parts of the coaster and brake mechanism that are shown in cross-section in Fig. 1 are shown in elevation. Here the parts are shown in position for braking. Fig. 3 is a cross-section on the line 3 3 of Fig. 1. Fig. 4 is a cross-section on the line 4 4 of Fig. 1. Fig. 5 is an end view of one of the parts to be hereinafter described, and Fig. 6 is an end view of another part.

A represents the hub of the back wheel of a bicycle, the spoke-flanges being represented by $a$ on either side. The hub A is represented in the drawings as depressed near its central point, so that its interior surface is formed into two similar truncated cones $A^0$, that join each other at their smaller ends. This arrangement produces a projection attached to the hub and extending into the interior thereof. A ring A' may be employed that is fitted snugly within the left-hand end of the hub and which presents a friction-surface for the brake. $A^2$ represents a cup that is secured within this same end of the hub and forms part of the raceway for ball-bearings for the hub. A cup $A^4$ forms part of the race for the ball-bearings for the other end of the hub. For forward driving the hub is clutched on the inner surface of its conical portions $A^0$ by the clutch-ring. The clutch-ring is made up of the clutch-shoes B', whose upper surfaces are indented and shaped to fit the inside surfaces of both conical portions $A^0$, as shown in Figs. 1 and 4. Three clutch-shoes B' are shown; but they may be made of different size from those shown, so that there may be more or there may be less than three. The clutch-shoes are separated by pins $c$, which project radially out from the nut C, (see Fig. 4,) and the clutch-shoes are normally held down upon the nut C and out of contact with the hub in the position shown in Fig. 2 by the spring $b$. They are in this normal position when the brake is applied. The nut C has the two tapered surfaces $c'$ $c^2$, united by the cylindrical surface $c^0$. At the lower edge of the tapered surface $c^2$ (which acts upon the clutch-ring) there is a cylindrical surface $c^3$. Upon the end of the nut adjacent to the surface $c'$ (which actuates the brake) there is a tooth $c^4$, whose function will be explained when the operation of the parts is explained. The inner surfaces $b'$ $b^2$ of the clutch-shoes B' are made to conform to the surfaces $c^2$ and $c^3$, respectively, of the nut C.

It is obvious that when the nut C is moved away from the clutch-shoes B' the clutch-shoes will be held down upon the nut by the spring $b$, the cylindrical surfaces $b^2$ of the clutch-shoes resting against the cylindrical surface $c^3$ of the nut, which surface prevents the clutch-shoes from sliding down, but holds them in such position that when they are forced out radially they will engage with both conical surfaces of the hub, and the tapered surface $c^2$ of the nut being out of engagement with the corresponding tapered surface $b'$ of the clutch-shoes. These parts are shown in Fig. 2 in the positions just described. If now the nut be moved inwardly, the clutch-shoes being retained against longitudinal movement, the cylindrical surface $c^3$ of the nut will slide along beneath the cylindrical surface $b^2$, and the tapered surface $c^2$ of the nut will come in contact with the tapered surfaces $b'$ of the clutch-shoes. If the nut C is moved inwardly still farther, the clutch-shoes will be forced up the tapered surface $c^2$ of the nut and will be expanded and brought into engagement with the conical surfaces $A^0$ of the hub. The clutch-shoes B' cannot move longitudinally with the nut C when the latter is moved to the right, because the portions $b^0$ of these shoes come in contact with the depressed portion of the hub, thereby limiting their longitudinal movement, and the clutch-shoes are retained against rotation with reference to the nut C when they come into engagement with the hub by the pins $c$. The clutch-shoes B' as they are expanded against the resistance of the spring $b$ by the longitudinal movement of the nut C to the right will center themselves because of their form and the relation of the conical surfaces of the portions $A^0$ of the hub to the tapered incline surfaces $c^2$ of the nut, so that the clutch-shoes will engage evenly with both conical surfaces $A^0$. Moreover, the expansible shoes adapt themselves to inaccuracies or imperfections in construction of the parts, and if the hub and nut are not truly concentric the clutch-shoes will engage effectively with the hub.

The nut C is internally threaded to correspond with the thread E' upon the sleeve E, upon which it is mounted. The sleeve E is mounted upon the axle X, and one of its ends is supported by ball-bearings which lie within the race formed between the inner surface of the end of the sleeve and the nut E upon the end of the axle. The outer surface of this end of the sleeve E, in connection with the cup $A^4$, above referred to, forms a ball-race for this end of the hub. Upon this end of the sleeve E is the driving-gear G, held thereon in a suitable manner, such as by the set-nut $g$.

On the left-hand end of the axle X is a block H, which has upon its inner end a series of teeth $h$ and upon its surface a series of projections $h'$, that may be rounded, as shown. The outer surface of the block, in connection with the cup $A^2$, above referred to, forms a race for ball-bearings for this end of the hub. The outer end of the block H is squared, as indicated by dotted lines in Fig. 5, and upon that squared end is fitted a plate or brake-arm I, (see Fig. 5,) which in turn is secured to the rear fork of the bicycle, thereby holding the block H against turning. A brake-ring composed, preferably, of a series of brake-shoes J (see Fig. 3) fit upon the block H and are held together and normally down upon said block by the spring $j$. (See Figs. 1 and 2.) These brake-shoes are normally in the position in which they are shown in Fig. 1, in which they are not in contact with the friction-ring A' and which is their position in forward driving. The shoulders $j'$ of the brake-shoes J, which are those parts of the brake-shoes that rest directly upon the block H, are notched to receive the projections $h'$. These projections hold the brake-shoes against rotation, though their round contour permits the shoes to ride upon them. The inner surfaces of the brake-shoes are tapered to correspond with the surfaces $c'$ of the nut C and the surfaces $a^2$ of the cup $A^2$, respectively. Lips $j^4$ on the inner edge of the brake-shoes J are adapted to lie against the cylindrical surface $c^0$ of the nut C, and these afford sufficient frictional contact between the brake-shoes and the nut C to prevent the latter from turning freely with the sleeve E on back pedaling when the parts are in position for forward driving.

The operation of the brake will now be readily understood. In forward pedaling the gear G, which is rigidly attached to the revoluble sleeve E, rotates the sleeve in a forward direction. As the sleeve E turns within the nut C the latter is moved longitudinally toward the clutch-shoes and coming in contact with them forces them outward against the conical portions $A^0$ of the hub A, so that the sleeve E, the nut C, and the hub A are bound together. For coasting the sprocket is rotated backwardly by back pedaling until the nut C is moved away sufficiently to allow the clutch-shoes B' to disengage from the hub. The spring $b$ effects this as soon as the pressure of the nut C is removed from the interior of said shoes. If the sprocket is held stationary in this position, the wheel is free to coast. By rotating the sprocket still farther backwardly the nut C is moved along the sleeve E until it comes into engagement with the brake-shoes J and forces them outward against the tension of the spring $j$ into frictional contact with the braking-surfaces of the ring A'. The tooth $c^4$ by engaging with one of the teeth $h$ on the block H will prevent the nut C from turning with the sleeve E. The frictional engagement between the friction-ring A' and the brake-shoes J when the brake is applied tends to rotate said shoes upon the block H and causes the brake-shoes to ride up on the projections $h'$, so that the brake-shoes are wedged between the ring A' and the block H, whereby greater braking action is brought into play.

What I claim is—

1. In a driving and coasting mechanism, the combination of a hollow hub having bearings at its ends; a driving mechanism extending within the hub; external threads upon the part extending within the hub; conical surfaces $A^0$ within the hub adapted to be engaged by a clutch-ring; an expansible clutch-ring adapted to engage said surfaces; and a clutch-nut upon the threaded portion of the driving mechanism, whereby the clutch-ring is expanded so as to engage the hub, substantially as described.

2. In a driving and coasting mechanism, the combination of a hollow hub having bearings at its ends; a driving mechanism extending within the hub; external threads upon the part extending within the hub; surfaces upon the hub adapted to be engaged by an expansible clutch-ring; a self-centering expansible clutch-ring adapted to engage such surfaces; and a clutch-nut upon the threaded portion of the driving mechanism whereby the clutch-ring is expanded into engagement with the hub, substantially as described.

3. In a driving and coasting mechanism, the combination of a hollow hub having bearings at its ends; a driving mechanism extending within the hub; external threads upon the part extending within the hub; a part of the hub adapted to be engaged by a clutch-ring; an expansible clutch-ring; and a clutch-nut upon the threaded portion of the driving mechanism whereby the clutch-ring is expanded so as to engage the hub, said nut having a shoulder adapted to support the clutch-ring when said ring is out of engagement, substantially as described.

4. In a driving and coasting mechanism, the combination of a hollow hub having bearings at its ends; a driving mechanism extending within the hub; external threads upon the part extending within the hub; conical surfaces $A^0$ within the hub adapted to be engaged by a clutch-ring; the expansible clutch-ring $B'$; and the clutch-nut C upon the threaded portion of the driving mechanism, having conical and cylindrical surfaces $c^2$, $c^3$, whereby the clutch-ring is expanded so as to engage the hub, and is supported when out of engagement therewith, substantially as described.

5. In a driving and coasting mechanism, the combination of a hollow hub having bearings at its ends; a driving mechanism extending within the hub; external threads upon the part extending within the hub; a part of the hub adapted to be engaged by a clutch-ring; an expansible clutch-ring comprising shoes; a clutch-nut upon the threaded portion of the driving mechanism, whereby the clutch-ring is expanded so as to engage the hub, substantially as described.

6. In a driving and coasting mechanism, the combination of a hollow hub having bearings at its ends; a driving mechanism extending within the hub; surfaces upon the hub adapted to be engaged by an expansible clutch-ring; an expansible clutch-ring; a clutch-nut upon the threaded portion of the driving mechanism, whereby the clutch-ring is expanded to engage the hub on forward driving; and projections from the nut whereby the clutch-ring is prevented from rotating with reference to the nut, substantially as described.

7. In a coaster and brake mechanism, the combination of a hollow hub having bearings at its ends; a driving mechanism having a part extending within the hub and having threads thereon; a part of the hub adapted to be engaged by a clutch-ring; an expansible clutch-ring; a clutch-nut upon the threaded portion of the driving mechanism, whereby the clutch-ring is expanded so as to engage the hub in forward driving, and a brake mechanism adapted to engage the hub on back pedaling, substantially as described.

8. In a coaster and brake mechanism, the combination of a hollow hub having bearings at its ends; a driving mechanism having a part extending within the hub; and having threads thereon; a part of the hub adapted to be engaged by a clutch-ring, and also a part adapted to be engaged by a brake-clutch; a block H within the hub secured against turning; projections $h'$ upon the surfaces of the block H; brake-shoes J notched to receive the projections $h'$, upon the block H; teeth $h$ upon the block H; the spring $j$; and a clutch-nut upon the threaded portion of the driving mechanism, having the tooth $c^4$ on its side, and adapted in forward pedaling to expand the clutch-ring so as to engage the hub, and on back pedaling both to expand the clutch-shoes, and to turn them upon the projections $h'$ so as to brake the hub, substantially as described.

FRANK B. CASE.

Witnesses:
NELSON E. SPENCER,
C. S. DAVIS.